US007918393B2

(12) United States Patent
Warwick et al.

(10) Patent No.: US 7,918,393 B2
(45) Date of Patent: Apr. 5, 2011

(54) LEAFING MECHANISM

(75) Inventors: Dennis James Warwick, Richfield, MN (US); Wolfgang Horst Obierai, Einhausen (DE); Kai Achim Kropp, Lautertal-Bedenkirchen (DE)

(73) Assignee: DataCard Corporation, Minnetonka, MN (US)

( * ) Notice: Subject to any disclaimer, the term of this patent is extended or adjusted under 35 U.S.C. 154(b) by 651 days.

(21) Appl. No.: 11/994,035

(22) PCT Filed: Jun. 30, 2005

(86) PCT No.: PCT/US2005/023125

§ 371 (c)(1),
(2), (4) Date: Dec. 27, 2007

(87) PCT Pub. No.: WO2007/005004

PCT Pub. Date: Jan. 11, 2007

(65) Prior Publication Data

US 2008/0206018 A1 Aug. 28, 2008

(51) Int. Cl.
*G06F 7/08* (2006.01)

(52) U.S. Cl. ........................................ 235/381; 235/487

(58) Field of Classification Search .................. 235/376, 235/380, 487, 492, 381

See application file for complete search history.

(56) References Cited

U.S. PATENT DOCUMENTS

| | | | | |
|---|---|---|---|---|
| 3,661,379 | A | | 5/1972 | Dolfini |
| 4,184,780 | A | * | 1/1980 | Kurihara et al. ................ 400/56 |
| 4,553,467 | A | * | 11/1985 | Goldner .......................... 84/487 |
| 4,597,592 | A | * | 7/1986 | Maurer et al. .................. 283/75 |
| 4,870,258 | A | * | 9/1989 | Mochizuki et al. ........... 235/379 |
| 5,897,144 | A | * | 4/1999 | Uno ................................ 283/77 |
| 6,135,503 | A | * | 10/2000 | Lob et al. ..................... 283/63.1 |
| 6,783,067 | B2 | | 8/2004 | Kreuter et al. |
| 2001/0045455 | A1 | | 11/2001 | Kreuter et al. |

FOREIGN PATENT DOCUMENTS

| | | |
|---|---|---|
| EP | 0 596 581 A2 | 5/1994 |
| EP | 0 980 840 A2 | 2/2000 |
| GB | 1046719 | 10/1966 |

OTHER PUBLICATIONS

Supplementary European Search Report issued Apr. 23, 2009 in co-pending European Application No. 05 76 3920.

* cited by examiner

*Primary Examiner* — Daniel St. Cyr
(74) *Attorney, Agent, or Firm* — Hamre, Schumann, Mueller & Larson, P.C.

(57) ABSTRACT

A machine and methods for automatically opening a closed book, for example a passport, to a desired page for subsequent processing on the page. The book is inserted into the machine in a closed configuration. The machine then opens the book to the appropriate page for subsequent processing either in the machine or in a separate processing machine. A pin is inserted between two adjacent sheets of the book to define a first book portion and a second book portion, and the pin is used to assist in moving the first book portion away from the second book portion to expose the desired page for subsequent processing.

19 Claims, 13 Drawing Sheets

LEAFING MECHANISM

This application is being filed as a PCT International Patent application in the name of DataCard Corporation, a U.S. national corporation. All countries have been designated.

FIELD OF THE INVENTION

The invention relates to a mechanism for opening a multiple sheet, closed book to a desired page for one or more subsequent processing operations to be performed on the page. In particular, the invention relates to a mechanism for opening a closed passport to a desired page for subsequent processing, for example printing and/or laser engraving, on the page.

BACKGROUND OF THE INVENTION

In some kinds of books, one or more pages of the book are provided with special printing, graphics and other processing. Often, the processing occurs on the page(s) prior to the sheets being assembled with other sheets and bound to form the book. In certain books, the processing on a page may occur after the sheets of the book have been assembled and bound. In this situation, the book must be opened to the correct page on which the processing is to occur.

For example, with a passport, it is often desirable to process a specific page of the passport, for example by personalizing the page with information, for example a photograph or name of the intended passport holder, unique to the intended passport holder. In addition, it is sometimes necessary to put a label on a page, insert a loose sheet, or count the sheets/pages to verify the construction or type of the passport.

In some known machines, a passport is presented by hand to the machine, with the passport opened by the machine operator to the appropriate page for processing on that page. These machines have limited throughput capability, as well as security issues and increased error rates due to operator interaction and handling of the passport, making them inadequate for secure, high volume production of passports. Many of these known machines are also provided with an internal sheet turning mechanism for turning a sheet of the passport if processing needs to occur on a page of the passport that is different than the initially processed page.

Efforts have been made to automatically process passports in a faster time, with minimal, or no, intervention and handling by an operator by designing a machine that will automatically open a passport to the correct page to be processed. Automatic processing results in faster production time, reduced operator error, improved security, and reduced production costs. Any system that is intended to automatically process passports must take into account the unique characteristics of a passport, such as preexisting serialization or printed information, security features, information placement on different pages, and the different number of pages or sheets that are present in passports.

One example of a system that can automatically process passports is disclosed in U.S. Pat. No. 6,783,067, assigned to DataCard Corporation, the assignee of the present application. The system disclosed in U.S. Pat. No. 6,783,067 includes laser engraving capability as well as leafing (i.e. sheet turning) capability. This permits the passport to be introduced into the machine in a closed state, with the machine then opening the passport to the appropriate page for personalization. The machine is fully automated, thereby enabling operation with minimal or no intervention and handling of the passports by an operator, as well as enabling significantly higher rates of passport production.

In passports, the sheets may be made of various materials that result in differing physical properties such as stiffness. Many conventional leafing mechanisms use rollers in order to turn the sheets. However, rollers have great difficulty in turning sheets that are stiff (such as a cover sheet or a plastic sheet), or can damage sheets by bending them too sharply thereby leaving a permanent crease in the sheet or damaging an integrated circuit embedded in the sheet.

Continued improvements in systems that can automatically open multiple sheet, bound books to the correct page for subsequent processing are desirable.

SUMMARY OF THE INVENTION

The invention relates to a machine and methods for automatically opening a book to a desired page for subsequent processing to be performed on the page. The book is inserted into the machine in a closed configuration. The machine then opens the book to the appropriate page for subsequent processing either in the machine or in a separate processing machine. A closed book is one where the front cover and back cover of the book are generally parallel to and facing one another, separated by sheets disposed between the front cover and back cover.

The book can be any type of multiple sheet book in which one of its pages needs to be processed after the sheets of the book have been bound, for example a passport or a passbook (i.e. savings book). The page to be processed can be any page of the book, for example the inside page of the front cover sheet of the book, the inside page of the back cover sheet of the book, or any page of any sheet between the front and back cover sheets.

The processing that occurs on the page can include a number of processing operations including monochromatic or multi-color printing and/or laser processing for example laser engraving or laser perforation. The processing can include the addition of information to the page that is unique to the intended holder of the book, for example printing of the holder's photograph, addition of the holder's name, address, signature, family information, and other personalization unique to the book holder. Processing can also include putting a label on the page, inserting a loose sheet, or counting the pages or sheets to verify the construction or type of the book.

In one aspect of the invention, a method of automatically opening a closed, multiple sheet bound book in a machine for subsequent processing on a desired page of the book is provided. One sheet of the book defines a front cover sheet and another sheet of the book defining a back cover sheet. The method comprises introducing the book in a closed configuration into the machine, inserting a pin between two adjacent sheets or facing pages of the book to define a first book portion and a second book portion, and using the pin to assist in moving the first book portion away from the second book portion to expose the desired page for subsequent processing.

In another aspect of the invention, a method of opening a closed, multiple sheet bound book in a machine for subsequent processing on a desired page of the book is provided. One sheet of the book defines a front cover sheet and another sheet of the book defining a back cover sheet. The method comprises introducing the book in a closed configuration into the machine, manipulating the closed book to spread the sheets apart, locating the desired page to be processed, inserting a pin between the sheet that contains the desired page and the sheet that contains the page that faces the desired page to define a first book portion and a second book portion, and using the pin to assist in moving the first book portion away from the second book portion and expose the desired page to be processed.

In yet another aspect of the invention, a machine for automatically opening a closed, multiple sheet bound book that is inserted into the machine for subsequent processing on a desired page of the book is provided. The machine comprises an input through which a closed, multiple sheet bound book is inserted, and an opening station at which the book is opened. The opening station includes a manipulating mechanism that manipulates the book in a manner to spread the sheets apart, a sensor positioned to sense the spread-apart sheets of the book, and an extensible and retractable pin positioned to be inserted between the sheet that contains the desired page and the sheet that contains the page that faces the desired page to define a first book portion and a second book portion.

DRAWINGS

Figure 9A:
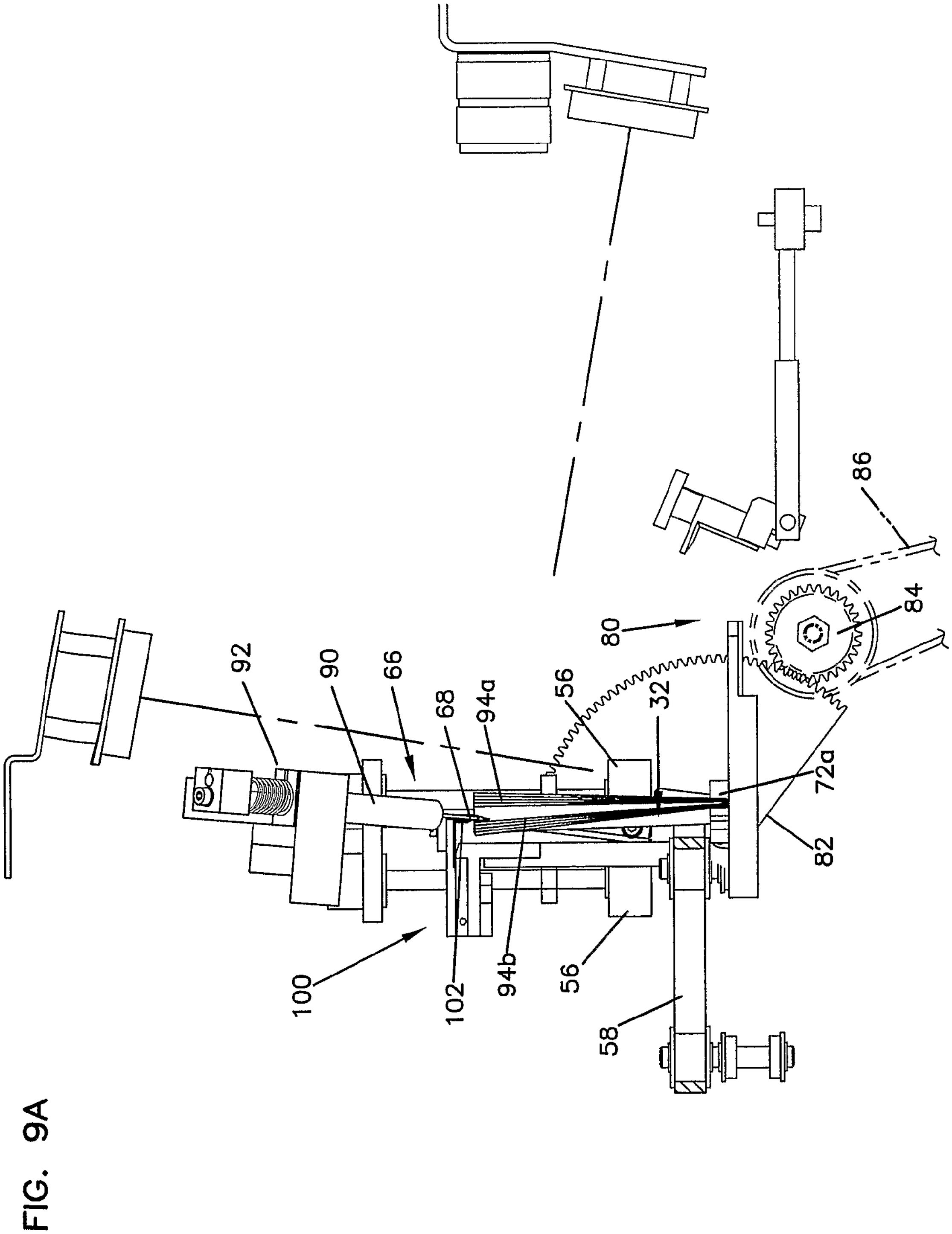
Figure 9B:
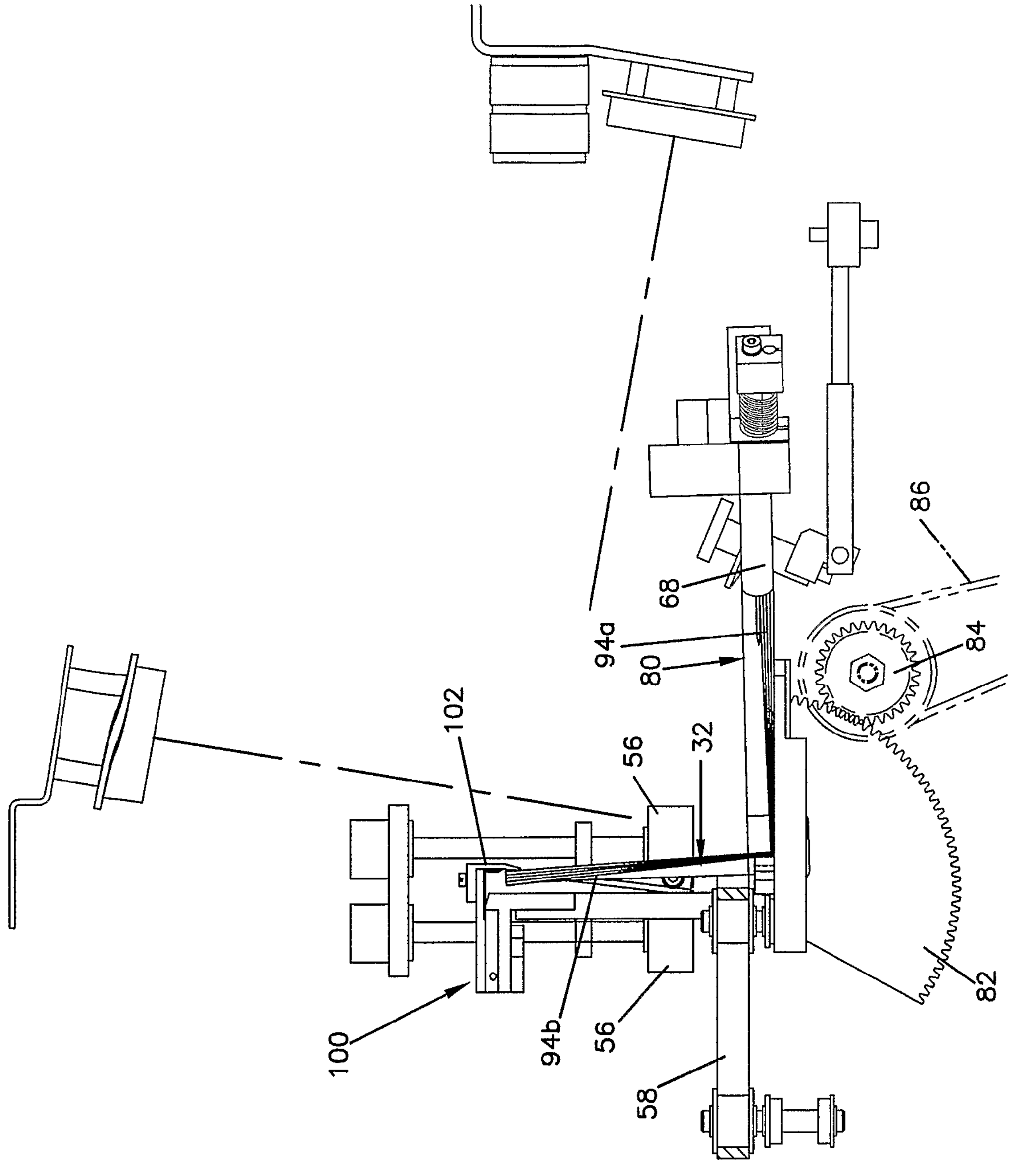
Figure 9C:
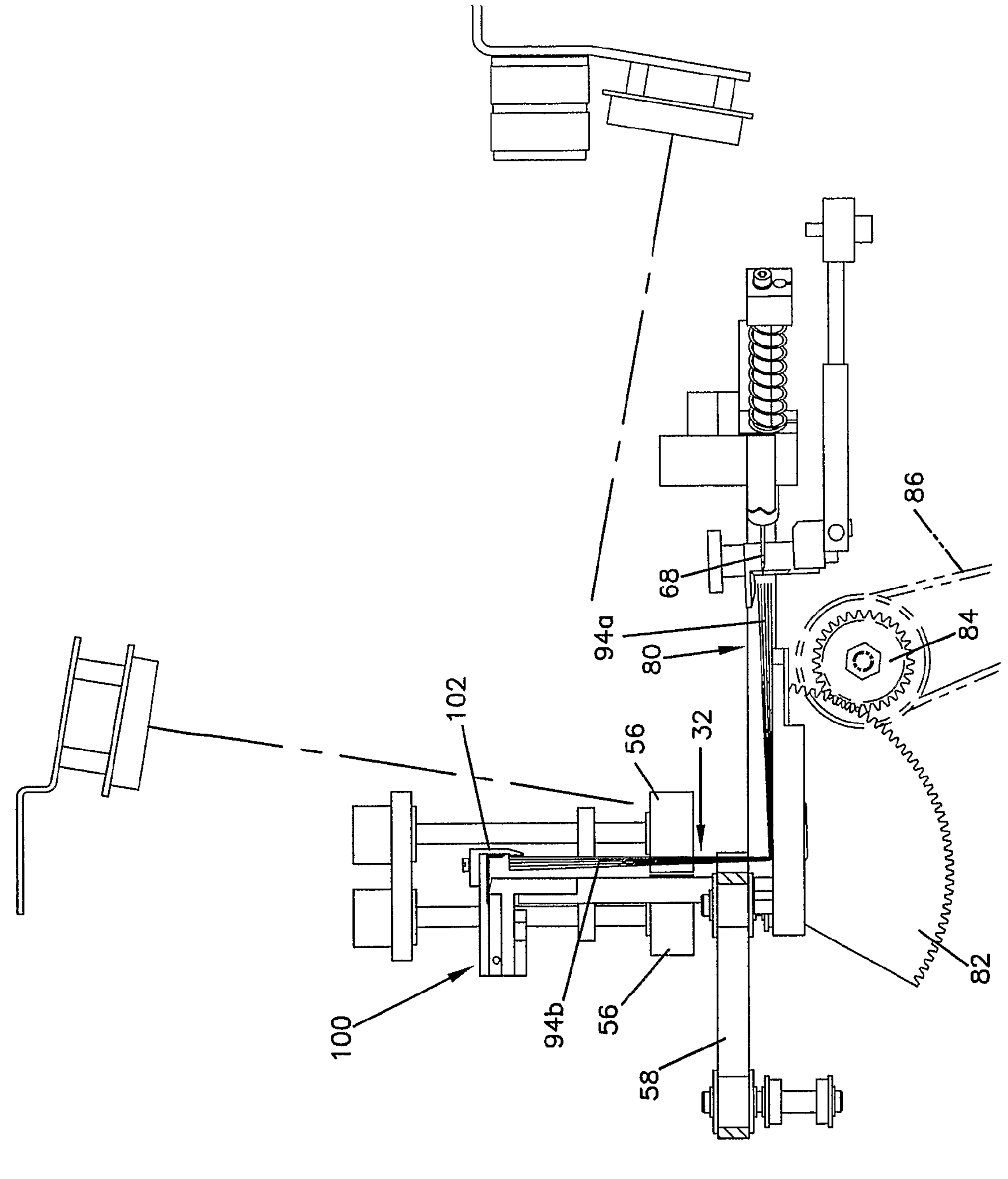

FIGS. 9A-C schematically illustrate stages in opening the passport.

Figure 10:
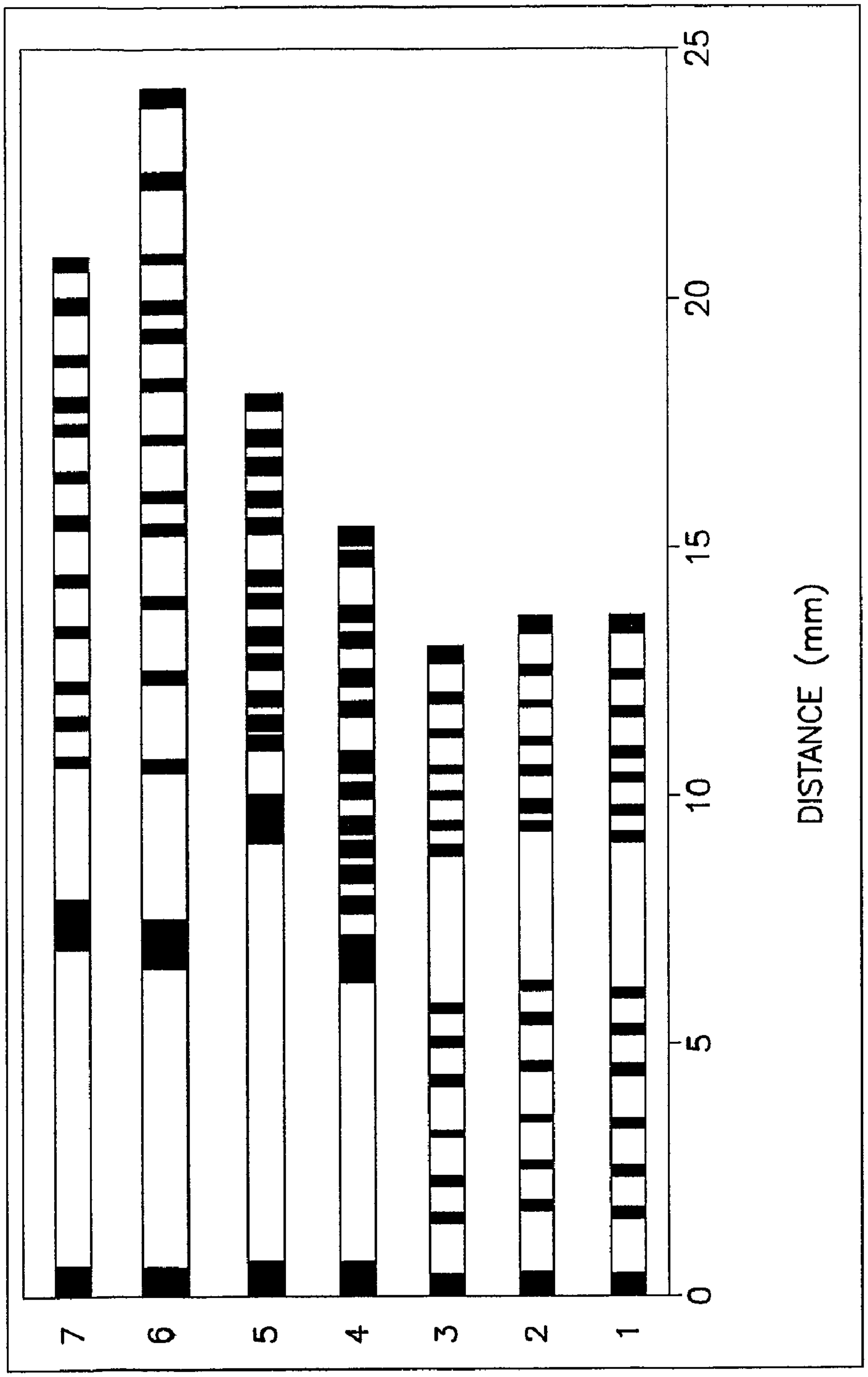

FIG. 10 is a chart that illustrates results of counting sheets in different books.

Figure 11:
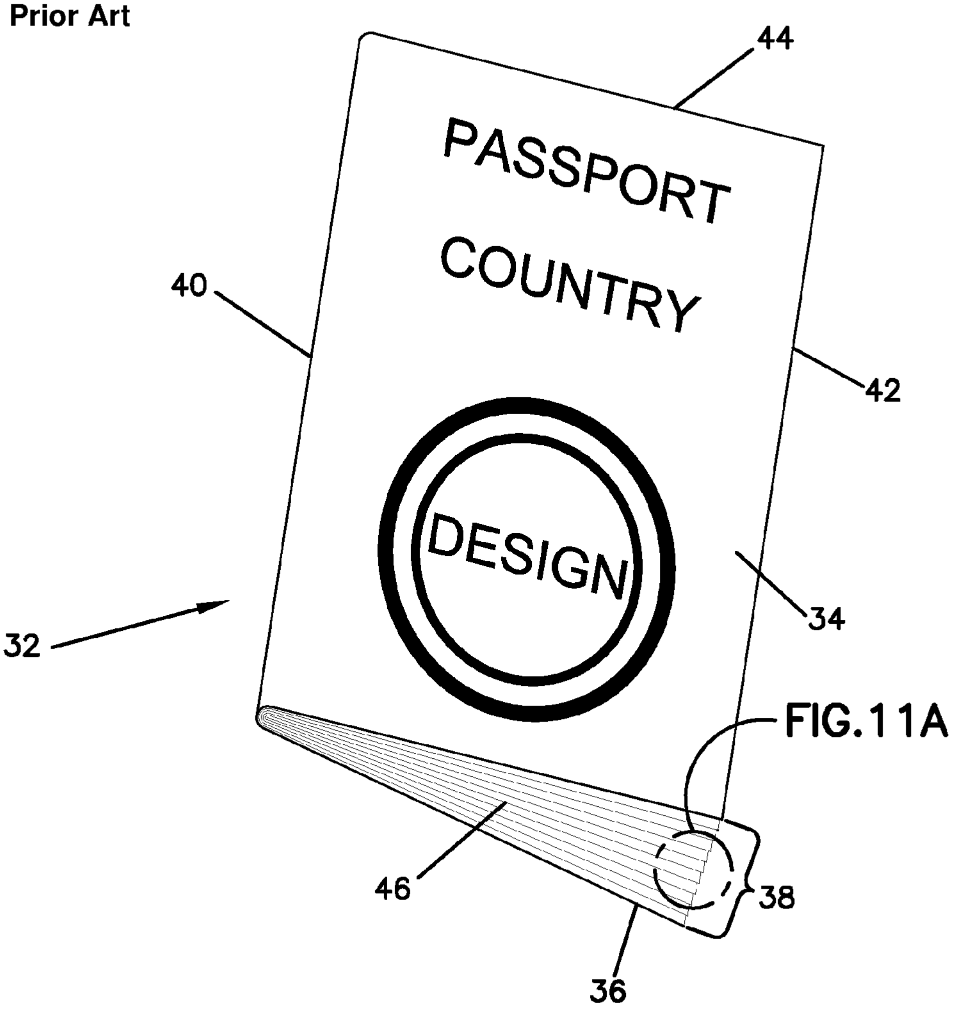
FIG. 11 Prior Art

FIG. 11 is a perspective view of a conventional passport.

Figure 11A:
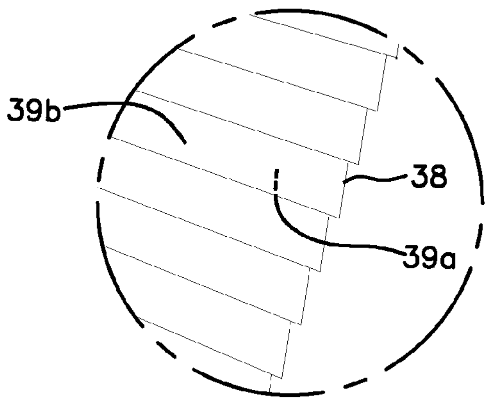
FIG.11A Prior Art

FIG. 11A is a detailed view of the circled portion in FIG. 11.

Figure 12A:
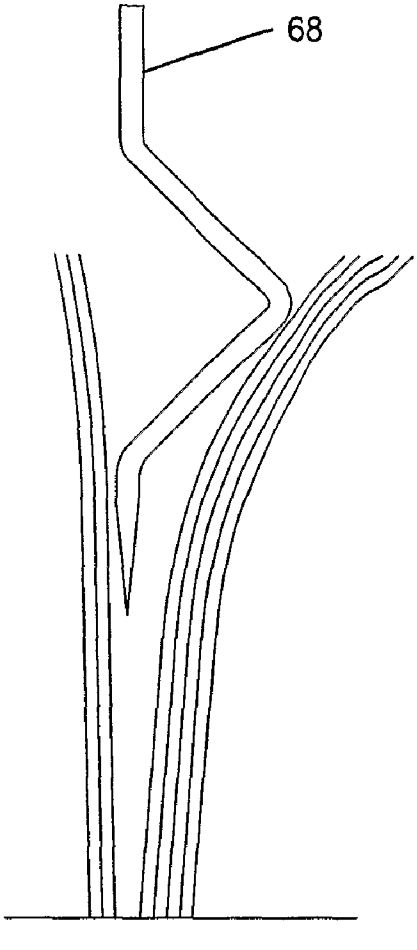
Figure 12B:
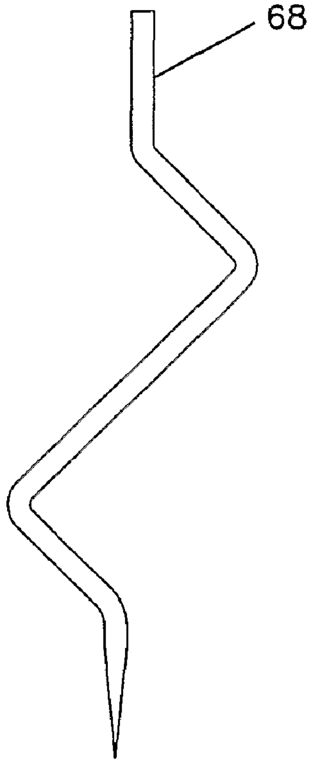

FIGS. 12A and 12B illustrate different embodiments of a bent pin that can be used to facilitate separation of the two portions of the passport.

DETAILED DESCRIPTION

The invention relates to a machine and methods for automatically opening a closed book to a particular page for subsequent processing to be performed on the page. The book is inserted into the machine in a closed configuration. A closed book is one where the front cover and back cover of the book are generally parallel to and facing one another, separated by sheets disposed between the front cover and back cover. The machine then opens the book to the appropriate page for subsequent processing either in the machine or in a separate processing machine(s).

The book can be any type of multiple sheet book in which one of the pages needs to be processed after the sheets of the book have been bound. The page to be processed can be the inside page of the front cover sheet of the book, the inside page of the back cover sheet of the book, or the page of any sheet between the front and back cover sheets. For convenience, the book will be described hereinafter as being a passport. However, it is to be realized that the concepts described herein can be applied to any type of multiple sheet bound book that requires processing on one or more of its pages.

The processing that occurs on the page of the passport can include a number of processing operations including monochromatic or multi-color printing and/or laser engraving. The processing can include the addition of information to the page that is unique to the intended holder of the passport, for example the printing of the passport holder's photograph, the addition of the passport holder's name, address, signature, family information, and other personalization unique to the passport holder. Processing according to the invention can also include putting a label on the page, inserting a loose sheet, or counting the pages or sheets to verify construction or type. Furthermore, processing of a page also includes processing operations that extend through one or more sheets of the passport, for example perforating the one or more sheets.

Prior to discussing the details of the opening machine and methods of the invention, some nomenclature that is used to describe the invention will be discussed with reference to FIG. 11 which illustrates a conventional passport 32. The passport 32 includes a plurality of sheets including a front cover sheet 34, a back cover sheet 36, and a plurality of intermediate sheets 38 between the front cover sheet 34 and the back cover sheet 36. The sheets are bound, for example by sewing, along one edge, for example the bottom edge, to form a binding 40. The opposite top edges 42 of the sheets are unbound. The sheets of the passport 32 also include opposite side edges 44, 46 that are also unbound. The words "top edges" and "bottom edge" used throughout this specification and claims refer to the orientation of the sheet edges when the passport is oriented as shown in FIG. 11 and the orientation of the passport as the passport enters the machine for opening.

As shown in detail in FIG. 11A, each sheet 38 has two sides 39*a*, 39*b*, with the side 39*a* forming a page and the side 39*b* forming another page. Each of the front and back cover sheets 34, 36 also have two sides 39*a*, 39*b*. The side 39*b* of the front cover sheet 34 forms a front cover page and the side 39*a* of the front cover sheet 34 forms an inside page. For the back cover sheet 36, the side 39*b* forms an inside page of the back cover sheet, while the side 39*a* forms a back cover page. Thus, as used herein, a sheet of the book has two sides, and each side forms a page of the book.

In many instances, the front cover sheet 34 and back cover sheet 36 are formed of a material that renders the passport resistant to wear and tearing and that protect the intermediate sheets 38. The construction of the front cover sheet and back cover sheet of a passport is well known to those of ordinary skill in the art. The intermediate sheets 38 are often formed from paper. The front cover sheet 34 and back cover sheet 36 often have a thickness greater than the thickness of the intermediate sheets 38, where thickness is measured between the two sides 39*a*, 39*b*. The thickness of each of the intermediate sheets is substantially the same, assuming that each of the intermediate sheets is made of the same material.

The front cover page 39*b* of the front cover sheet 34 typically includes lettering that indicates that the book is a passport and indicating the country that issued the passport, along with a symbol or design for the issuing country. The inside page 39*a* of the front cover sheet 34 is often processed so that it is provided with information that is unique to the intended passport holder, for example the person's photograph, the person's name and address, etc. as well as information pertaining to the passport, for example the passport number, issue date and date of expiration. One or more of the intermediate sheets 38, on either of the pages 39*a*, 39*b* of a sheet, may also need to be processed, for example adding information on the passport holder's family and emergency contact information.

Figure 1:
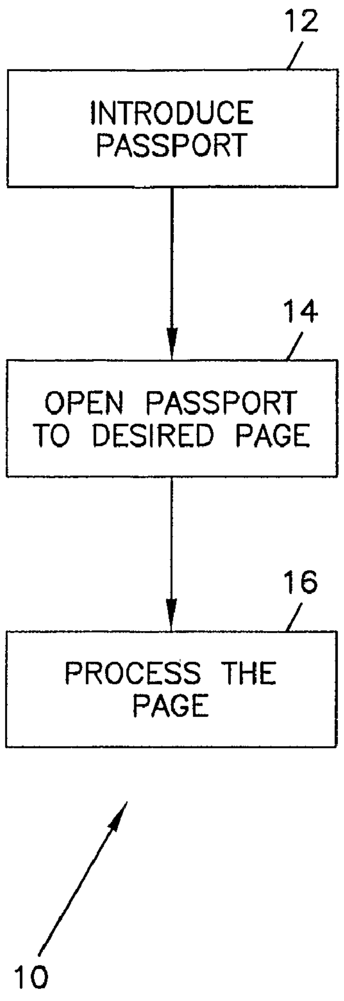
FIG. 1 illustrates an embodiment of a method in accordance with the invention.

Turning now to FIG. 1, a method 10 of automatically opening a closed passport to a particular page for subsequent processing to be performed on the page is illustrated. At block 12, a passport that is closed is introduced into the machine (to be later described). The passport is then opened to the desired page at block 14. As part of the opening process and as will be described in more detail below for the machine, a pin is inserted between two adjacent sheets of the passport to define a first portion and a second portion. The pin is then used to assist in moving the first portion away from the second portion to expose the desired page for subsequent processing. Once the passport is opened, the page is then processed at block 16.

Figure 2:
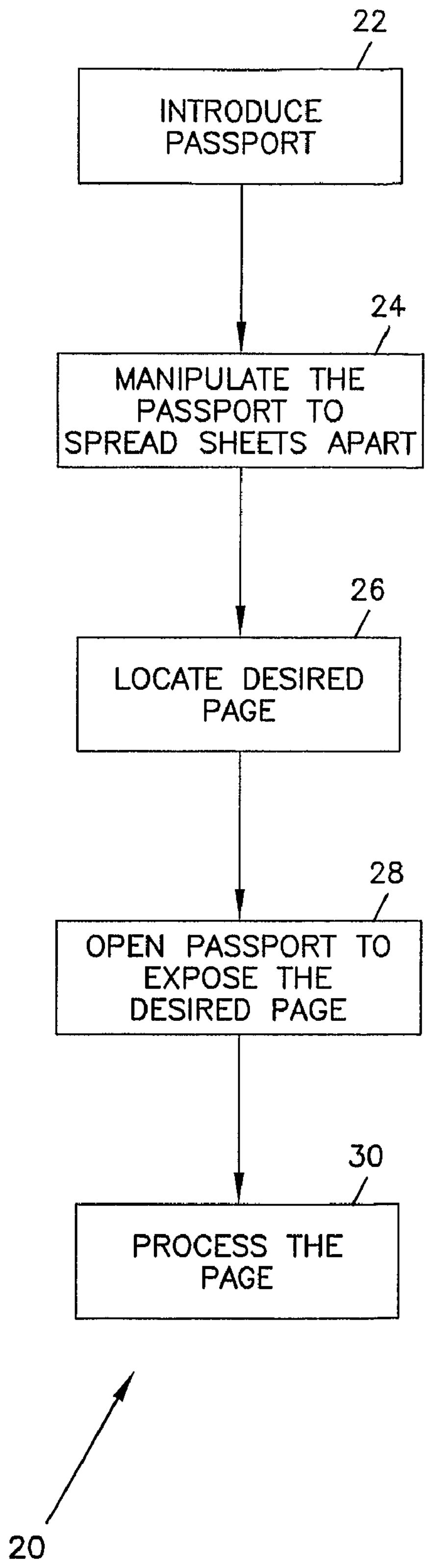
FIG. 2 illustrates a further embodiment of a method in accordance with the invention.

A more detailed method 20 of automatically opening a closed passport to a particular page for subsequent processing to be performed on the page according to the invention is illustrated in FIG. 2. The method 20 includes introducing a closed passport into the machine at block 22. The passport is then manipulated at block 24 in a manner to cause the sheets of the passport to spread apart. The desired page to be processed is then located at block 26. As will be discussed in further detail below, locating the desired page can include counting the sheets of the passport to reach the sheet that contains the desired page, as well as counting the total number of sheets in the passport. The passport is then opened to expose the desired page at block 28. As will be described in more detail below for the machine, a pin is inserted between the sheet that contains the desired page and the sheet that contains the next page to define a first portion and a second portion, and the pin is used to assist in moving the first portion away from the second portion and expose the desired page to be processed. Once the passport is opened, the page can then be processed at block 30.

Figure 3:
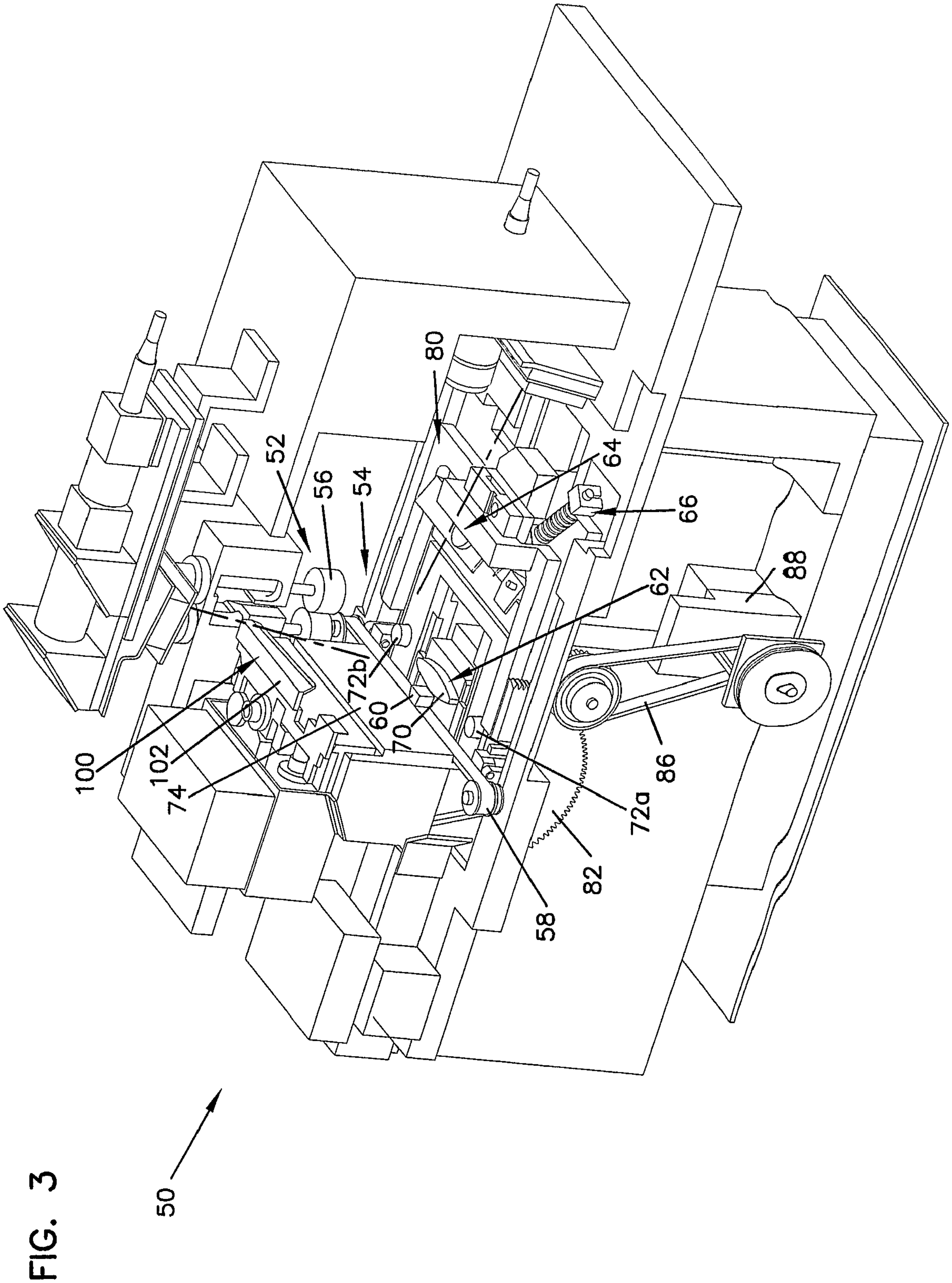
FIG. 3 is a perspective view of portions of the machine of the invention.

With reference to FIG. 3, the machine 50 that is configured to automatically open a passport is illustrated. The machine 50 generally includes an input 52 through which a closed passport 32 is introduced into the machine 50, and an opening station 54 at which the passport is opened. The machine 50 can form a module for use in a modular passport processing system, such as the system disclosed in U.S. Pat. No. 6,783,067 in the name of DataCard Corporation. When used as a module in a modular system, the machine 50 could receive a passport from an input hopper located upstream of the machine 50, with passports being fed one-by-one to the machine 50. The machine 50 would then open the passport for subsequent processing by a downstream module of the system. Alternatively, the machine 50 can be a part of a larger machine that includes passport processing capability.

The input 52 includes a pair of feed rollers 56, shown in FIGS. 3-7, which help introduce a closed passport 32 into the machine 50 and drive the passport toward the opening station 54. A drive belt 58 is then used to drive the passport completely into the opening station 54 and properly position the passport for opening. A tab 60 connected to the drive belt 58 engages the trailing end of the passport for pushing the passport completely into the opening station 54 and into position for opening. After opening, the tab 60 and drive belt 58 then drive the opened passport toward an output of the machine 50 through which the opened passport exits the machine.

If the machine 50 includes processing equipment incorporated therein (not shown) for processing the page of the passport once it is opened, the processing is performed. The belt 58 and tab 60 would then drive the passport toward the output. Preferably, once the passport is opened, the passport is transported to separate processing equipment (not shown) downstream from the machine 50.

Figure 4:
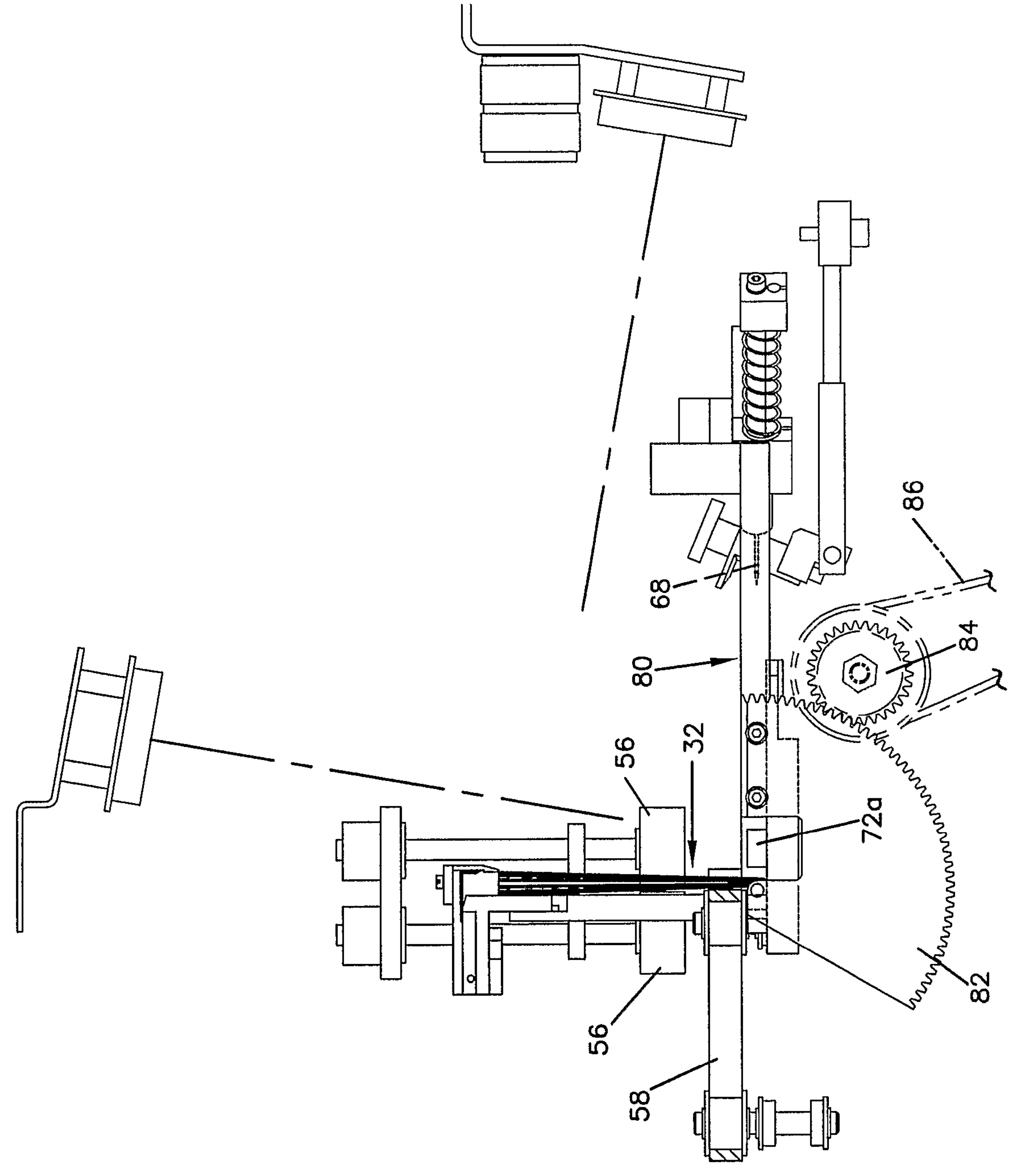
FIG. 4 is a side view of the machine showing a passport introduced into position for opening.
Figure 5:
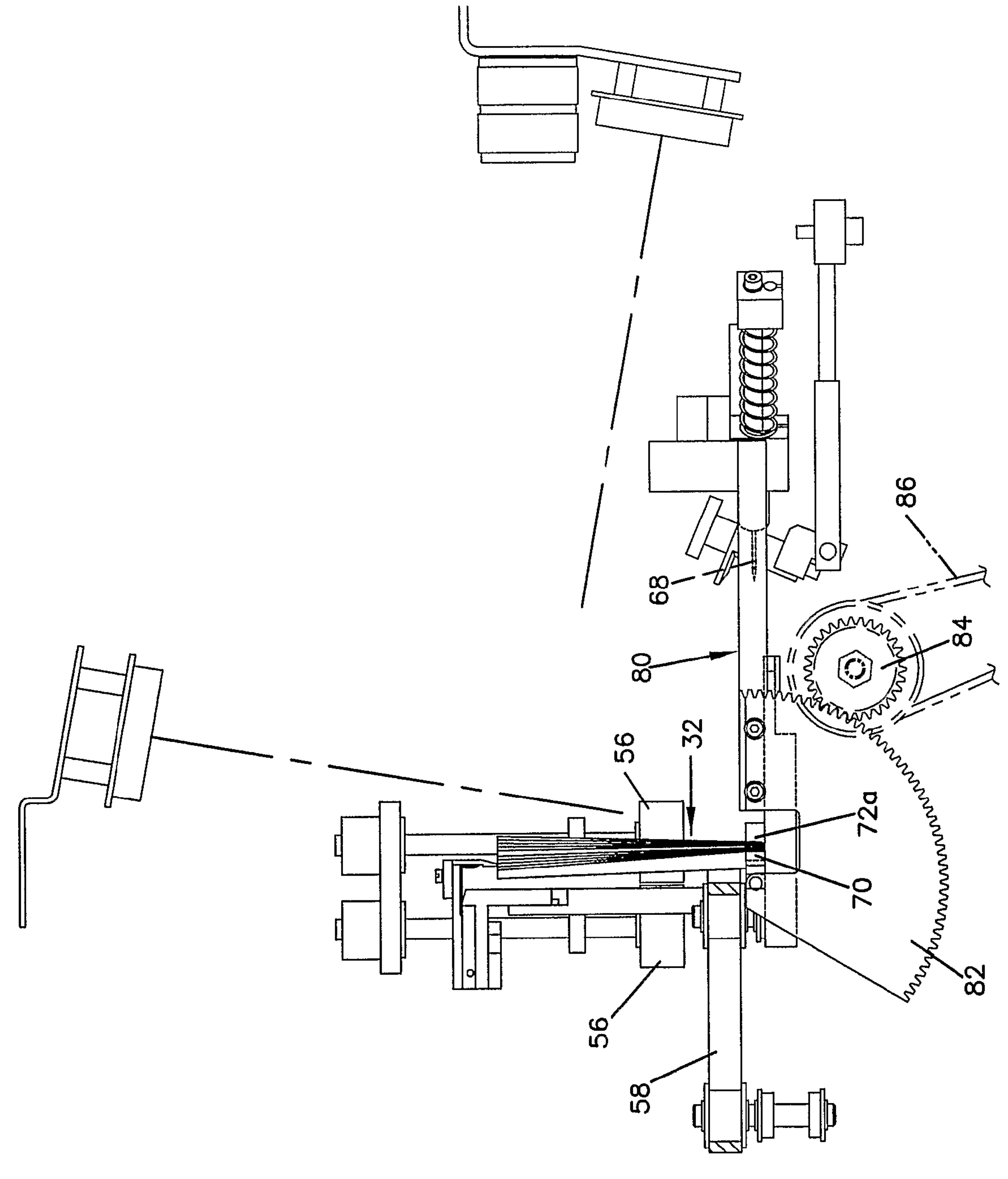
FIG. 5 is side view similar to FIG. 4, but showing the passport manipulated to spread the sheets apart.

With reference to FIG. 4, the passport 32 enters the machine 50 in a vertical orientation with the binding 40 facing downward, the top edges 42 facing upward, the side edge 46 acting as the leading edge of the passport and the side edge 44 acting as the trailing edge and being engaged by the tab 60, so that the front cover sheet 34 faces toward the drive belt 58 and the back cover sheet is exposed.

Returning to FIG. 3, the opening station 54 is configured for opening the passport to the desired page. In particular, the opening station 54 includes a manipulating mechanism 62 that manipulates the passport to spread the sheets apart, a sensing mechanism 64 that senses the sheets of the passport for use in locating the desired page and counting the number of sheets of the pass port, and a pin mechanism 66 for inserting a pin 68, shown in FIG. 4, between the sheet containing the desired page and an adjacent sheet containing a page that faces the desired page and for assisting in opening the passport at the desired page.

The manipulating mechanism 62 is designed to manipulate the passport 32 in a manner to spread the sheets apart. Spreading the sheets apart helps the sensing mechanism 64 to count the sheets and locate the desired page, and facilitates insertion of the pin 68 between the desired page and an adjacent page. In some instances, the sheets of the passport may be spread apart enough due to the inherent construction of the passport, in which case the manipulating mechanism 62 may not be needed.

Figure 6:
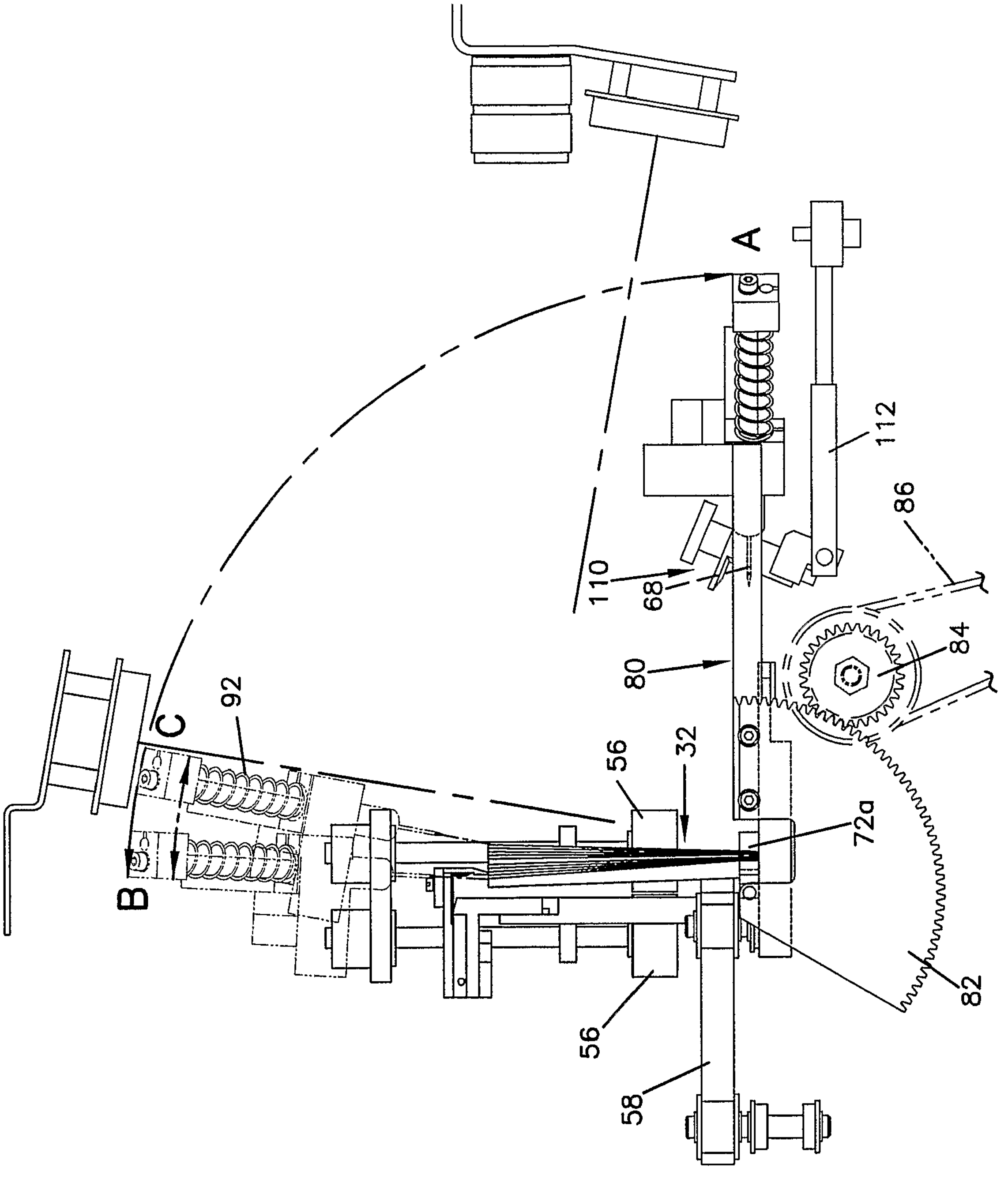
FIG. 6 is another side view showing movement of the swing arm that contains the sensing mechanism and pin mechanism.
Figure 7:
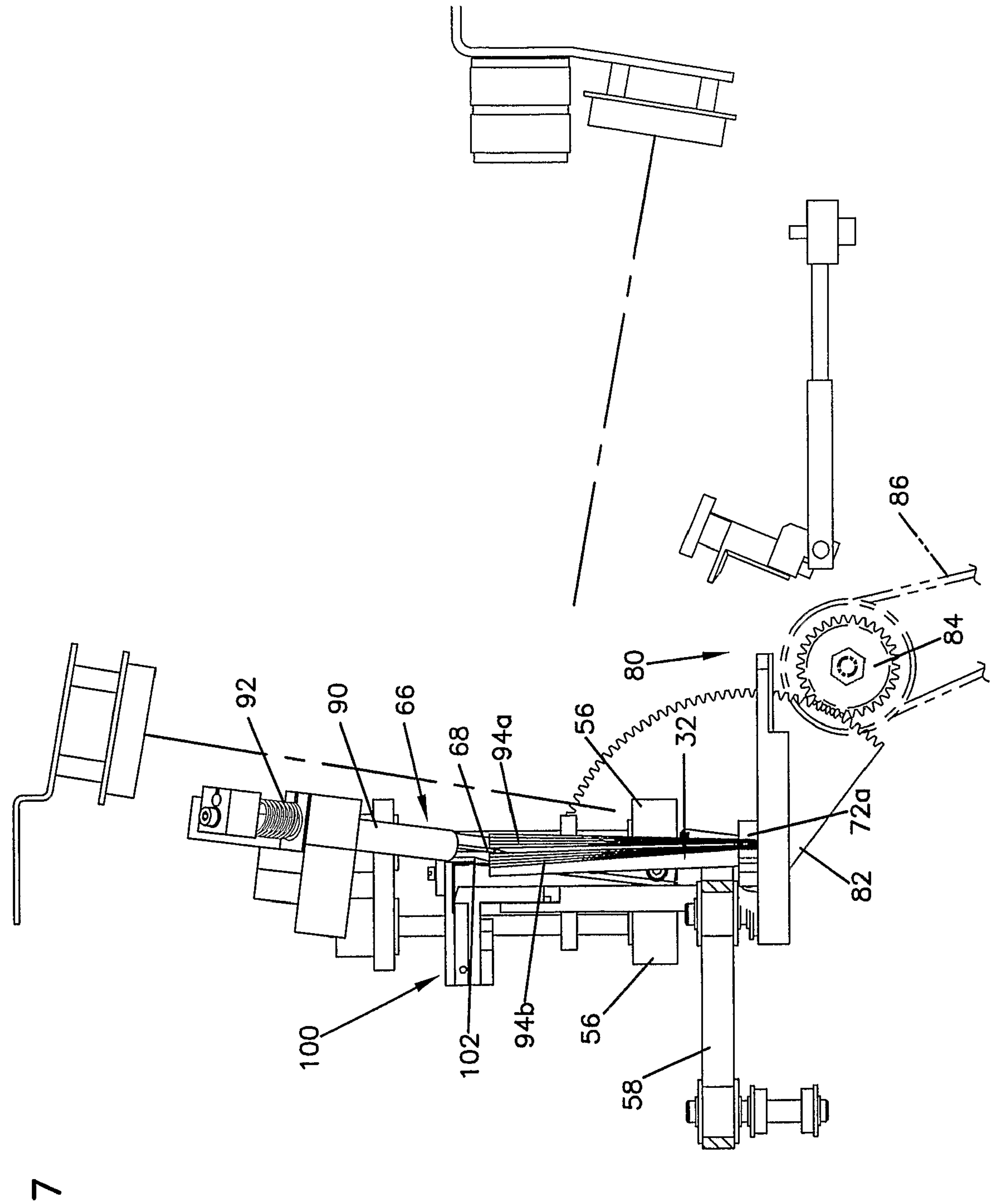
FIG. 7 is another side view showing the pin inserted between two sheets to separate the passport into a first portion and a second portion.
Figure 8:
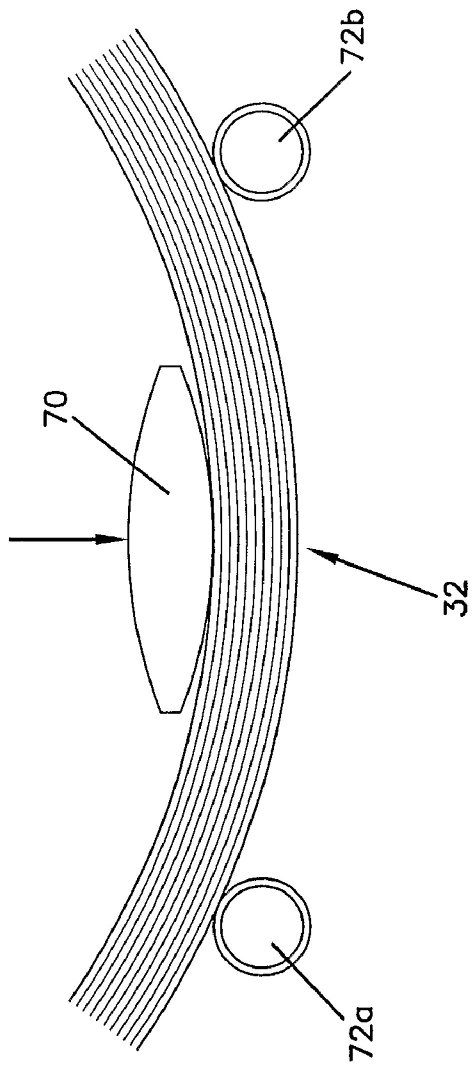
FIG. 8 is a top view that schematically illustrates the engagement between the manipulating mechanism and the passport to spread the sheets apart.

FIGS. 3-8 illustrate one embodiment of the manipulating mechanism 62. The mechanism 62 is designed to bend the binding 40, which causes the sheets 34, 36, 38 to fan apart as shown in FIGS. 5-8. The mechanism 62 includes a moveable actuator 70 that is configured and positioned to engage a central portion of the binding 40 on one side of the passport and a pair of posts 72*a*, 72*b* that are configured And positioned to engage the opposite side of the passport adjacent the passports ends, as best shown in FIG. 8. The actuator 70 is actuatable by a suitable actuating mechanism (not shown) toward and away from the passport. Prior to the passport being driven into position by the drive belt 58, the actuator 70 is positioned generally behind the wall 74 to allow the passport to freely enter. Once the passport is in position, the actuator 70 is then actuated toward the passport and into engagement therewith.

The posts 72*a*, 72*b* are actuatable upward and downward by a suitable actuating mechanism (not shown). The posts 72*a*, 72*b* are in the position shown in FIG. 3 (i.e. up position) upon entry of a passport to assist in guiding the passport into position. Once the passport is driven into position, the posts 72*a*, 72*b* are positioned on the side of the passport opposite from the actuator 70. As shown in FIGS. 4-7, both the actuator 70 and the posts 72*a*, 72*b* are sized to engage the bottom edge portion of the passport 32. For example, the actuator 70 and the posts 72*a*, 72*b* can project upwardly beyond the binding 40 about 1.27 cm (0.5 inch).

With reference to FIG. 8, once the passport 32 is driven into position, the passport is manipulated by actuating the actuator 70 and the posts 72*a*, 72*b* toward one another. The actuator 70 and posts 72*a*, 72*b* cause the binding 40 to bend, which causes the sheets 34, 36, 38 to fan apart. The difference in the spacing of the sheets as a result of manipulating the passport is evident from a comparison of FIG. 4, which shows the passport prior to manipulation, and FIGS. 5-7 which show the passport manipulated to fan the sheets apart. It is to be realized that any other means of manipulating the passport to cause the sheets to fan apart could be used as well.

Once the passport is manipulated to spread the sheets apart, the sensing mechanism 64 locates the desired page in need of processing. Both the sensing mechanism 64 and the pin mechanism 66 are mounted on a swing arm 80 that is moveable between a home position shown in FIGS. 3-5 and a sensing position shown in FIGS. 6-7. With reference to FIG. 4, the swing arm 80 is fired to a gear segment 82 which in turn is in engagement with a drive gear 84. The drive gear 84 is driven by a drive belt 86 which is actuated by a drive motor 88 (see FIG. 3). When the drive gear 84 is actuated by the motor 88, the gear segment 82 is driven, thereby causing the swing arm 80 with the sensing mechanism 64 mounted thereon to move between the home and sensing positions and to any position therebetween.

By actuating the swing arm 80 in the appropriate direction, the sensing mechanism 64 is moved above the top edges 42 of the sheets of the passport. The sensing mechanism 64 includes a sensor for sensing the individual sheets of the passport. The sensor can be any sensor that is suitable for sensing individual sheets of the passport, for example sensor model LG5B65 available from Banner Engineering Corp. of Minneapolis, Minn. This sensor is suitable for sensing the presence of the sheets and also the thickness of the sheets.

The sensor of the sensing mechanism is positioned proximate the center of the swing arm so that sensing of the sheets occurs proximate the center of the sheets. When the passport is manipulated to fan out the sheets, the maximum fanning (i.e. the maximum sheet spread) occurs proximate the center of the passport with the fanning decreasing toward the side edges. Therefore, sensing proximate the center of the sheets facilitates sensing of the sheets. However, depending on the construction of the book, it may be advantageous to position the sensor closer to one of the edges 44, 46 to sense the sheets closer to the edges.

With reference to FIG. 6, the operation of the sensing mechanism 64 during sensing of the passport sheets will be described. Initially, the swing arm 80 is at home position A. Once the passport is positioned and manipulated to fan the sheets, the swing arm 80 is actuated to position B. The arm 80 is then actuated to position C, and then moves back toward position B. When the arm 80 moves from position B to position C, the sensor of the sensing mechanism notes the position of each sheet and counts the total number of sheets in the passport 32. Counting the total number of sheets acts as a check to determine whether the sensor is working and whether the correct passport is present by comparing the counted number of sheets against the expected number of sheets. If no sheets have been counted, or the counted number differs from the expected number, the machine user can be alerted that a problem may exist.

After counting, the arm 80 moves from position C back toward position B so as to move back to the location of the desired page and insert the pin. The machine 50 knows the page that needs to be processed and on which sheet that page is located. Since the position of each of sheet is noted by the sensor, the machine knows where to insert the pin once the desired page is reached. Once the desired page is reached, the swing arm stops, waiting for the pin 68 to be inserted between the desired page and the adjacent page.

FIG. 10 is a chart that illustrates results of counting sheets in different types of books using the machine and sensing mechanism 64 described herein. The black areas represent sheets, while the white areas represent spaces between the sheets. Examples 1-3 are the results achieved by sensing three different, 14 sheet passport-type books, where the intermediate sheets are formed of paper and the front cover sheets and the back cover sheets are thicker than the intermediate sheets as represented by the greater thickness of the black bars at the beginning and ends of each example. Examples 4-7 are the results achieved from scanning an additional four passport-type books, where the first sheet after the cover is a different thickness (e.g. about 7 mm) and material (i.e. plastic) than the other sheets, as represented by the second black bar in examples 4-7 being thicker than the other black bars in each example. The results in Examples 4-7 show the first 14 sheets of each book (the books in Examples 4 and 5 had 35 total sheets, while the books in Examples 6 and 7 had 19 total sheets).

Returning to FIGS. 6 and 7, once the desired page is found, the pin 68 of the pin mechanism 66 is then inserted between the desired page and an adjacent page on an adjacent sheet. When the pin 68 is inserted, a first passport portion 94*a* and a second passport portion 94*b* are formed as shown in FIG. 7. The first portion 94*a* is formed by the passport sheets located to the right (when viewing FIG. 7) of the pin 68, while the second portion 94*b* is formed by the passport sheets located to the left of the pin 68.

Since the adjacent sheets of the book may not be aligned with equal spaces between them over their length, it is desirable to have whichever apparatus is used to enter between the sheets, for example the pin 68, as small as possible and be only a single point. The pin 68 is relatively thin, somewhat similar to a sewing needle, to facilitate insertion between the sheets. However, the pin should not be sharp to avoid cutting or scratching of the pages on the sheets. A wider object or multiple points could be used, but this would reduce the reliability of the opening process. A wider object could come down on a sheet rather than in the space between adjacent sheets, resulting in damage to the sheet edge and the inability to find the desired location. Further, multiple points could enter in different spaces between sheets.

The pin 68 is actuatable by a suitable actuating mechanism 90 so that the pin 68 is extensible toward the pages to enable it to be inserted between the pages, and rectractable back to a retracted position when a new passport is to be opened. In the illustrated embodiment, the actuating mechanism 90 is a stepper motor, although other actuating mechanisms could be used. A coil spring 92 is used to retract the pin 68 back to the retracted position upon release of the solenoid. Depending on the actuating mechanism that is used, the spring may not be necessary.

As shown in FIGS. 12A and 12B, the pin 68 could also have a bent structure to facilitate opening the book up by increasing the space between the two portions 94*a* and 94*b*. The increased separation facilitates capture and clamping of the second portion 94*b*. Other configurations of the pin are possible, such as a straight pin with portions extending from either side to increase the spacing between the two portions 94*a*, 94*b*.

As shown in FIG. 3, the pin mechanism 66 is located to the side of the sensing mechanism 64 adjacent one of the side arms of the swing arm 80. As a result, the pin mechanism 66 is oriented at an angle so that the pin 68 will enter between two sheets proximate the center of the passport near where the sensor senses the sheets. In the illustrated embodiment, the pin 68 enters through the top edges of the sheets. However, the pin mechanism 66 could be located so that the pin 68 enters through the top edges near the sides of the passport, or positioned to enter the side edges of the sheets.

With reference to FIG. 3, a clamp mechanism 100 is positioned on top of the wall 74. The clamp mechanism 100 is configured to clamp the second portion 94*b* of the passport 32 after the pin 68 has been inserted. Returning to FIG. 7, once the pin is inserted, the swing arm 80 will actuate toward position B which will cause the sheets of the second portion 94*b* to clear a ledge 102 formed on the clamp mechanism 100. The clamp mechanism 100 will then actuate downward so that the ledge 102 enters between the first and second portions 94*a*, 94*b*. The ledge 102 will then be actuated backward to clamp the second portion 94*b* against the wall 74. The swing arm 80 will then be actuated back to the home position A (see FIG. 6). Because the pin 68 is still disposed between the portions 94*a*, 94*b*, the pin 68 will cause the first portion 94*a* to move away from the second portion 94*b*, eventually opening the passport once the swing arm reaches the home position. When the passport is opened, the first portion 94*a* and the second portion 94*b* will be approximately at 90 degrees relatively to each other. However, before returning to the home position A, the pins 72*a*, 72*b* are retracted downward so as to not obstruct portion 94*a* from laying flat as shown in FIG. 9C FIGS. 9A-C schematically depict the opening of the passport by the pin 68. The pin is inserted between the desired page and an adjacent page to create the first and second portions 94*a*, 94*b* (FIG. 9A). The second portion 94*b* is then clamped by clamp mechanism 100 and the pin 68 is then actuated clockwise to swing the first portion 94*a* away from the second portion 94*b* (FIG. 9B). Once the pin is at the home position, the passport is fully opened with the first portion 94*a* and second portion 94*b* at approximately 90 degree angles relative to each other (FIG. 9C).

Once the swing arm 80 is back at the home position, a clamp mechanism 110 for the first portion 94*a* is actuated by an actuating mechanism 112 to clamp the first portion 94*a* to prevent the first portion 94*a* from moving back toward the second portion 94*b*. Once the clamp mechanism 110 clamps the first portion 94*a*, the pin 68 is retracted.

The pin 68 and swing arm 80 could be used to return the first portion 94*a* to be substantially parallel to the second portion 94*b* in the event of an error, for example the passport being opened to an incorrect page, or where the machine works together with an upstream machine, such as a printer, so that the passport enters the machine 50 in an already opened orientation. To return the first portion 94*a* parallel to the second portion 94*b*, the pin 68 is retracted, the swing arm 80 is positioned so that the pin 68 is on the other side of the first portion 94*a*, the pin 68 is extend behind the back cover sheet 36 and the swing arm 80 is actuated to bring the first portion 94*a* substantially parallel to the second portion 94*b*. The process steps described above could be repeated in order to open the passport to the desired page, or the passport could be sent out of the machine 50 in a closed orientation. Furthermore, since there is the ability to close the passport, it is to be realized that the passport could have entered the machine 50 in an already opened orientation from an upstream machine.

The page to be processed is preferably part of the second portion 94*b* and is oriented generally parallel to the wall 74. However, the page to be processed can be part of the first portion 94*a*. For example, processing of the first portion 94*a* can include using a camera to capture an image on the page of the first portion, reading a barcode, or reading/writing to an integrated circuit chip. The page can be processed in the machine 50 if the machine is provided with suitable processing equipment. Alternatively, the now opened passport can be transported out of the machine by the belt 58 and tab 60 for processing in equipment separate from the machine 50. At a suitable point in time prior to processing or transporting the passport from the machine, the pressure of the actuator 70 on the passport is released.

In certain circumstances, the passport may naturally open to the correct page to be processed simply as a result of opening the passport. For example, if one holds a passport and starts to open the passport at some arbitrary intermediate sheet 38, the passport will often tend to open at the inside page of the front cover sheet 34 unless the person holds the intermediate sheets that are located between the front cover sheet 34 and the page where the passport has started to be opened. The tendency of many passports to open at the inside page of the front cover sheet 34 inherently results from the construction of those passports.

This tendency can be exploited such that if a person wants to process the inside page of the front cover sheet, or any page to which the passport naturally tends to open, the pin 68 could be inserted between two sheets at any arbitrary location. The second portion of the passport could then be loosely clamped as the pin is swung toward the home position. The action of the first portion swinging away from the second portion causes sheets from the second portion to be pulled toward the first portion. The sheet(s) that remains at the second portion contains the page to which the passport tends to normally open, for example the inside page of the front cover sheet.

As a result, the method discussed with respect to FIG. 1 could be accomplished without manipulating the passport to fan out the sheets and/or without using a sensing mechanism to sense the individual sheets.

The invention claimed is:

1. A method of automatically opening a closed, multiple sheet bound book in a machine for subsequent processing on a desired page of the book, one sheet of the book defining a front cover sheet and another sheet of the book defining a back cover sheet, comprising:

- introducing the multiple sheet book in a closed configuration into the machine;
- inserting a pin between two adjacent sheets of the book to define a first book portion and a second book portion; and
- using the pin to assist in moving the first book portion away from the second book portion to expose the desired page for subsequent processing.

2. The method of claim 1, wherein the book is introduced into the machine in a vertical orientation with its binding facing downward, top edges of the sheets facing upward, and opposite side edges of the sheets facing sideways.

3. The method of claim 2, wherein the pin is inserted between the two adjacent sheets through the top edges of the sheets.

4. The method of claim 1, wherein the pin is inserted proximate the centers of the adjacent sheets.

5. The method of claim 1, wherein the book is a passport and the desired page is on the front cover sheet, the back cover sheet, or a page on a sheet that is next to the front cover sheet or the back cover sheet.

6. A method of opening a closed, multiple sheet bound book in a machine for subsequent processing on a desired page of the book, one sheet of the book defining a front cover sheet and another sheet of the book defining a back cover sheet, comprising:

- introducing the multiple sheet book in a closed configuration into the machine;
- manipulating the closed book to spread the sheets apart;
- locating the desired page to be processed;
- inserting a pin between the sheet that contains the desired page and the sheet that contains the page that faces the desired page to define a first book portion and a second book portion; and using the pin to assist in moving the first book portion away from the second book portion and expose the desired page to be processed.

7. The method of claim 6, wherein the book is introduced into the machine in a vertical orientation with its binding facing downward, top edges of the sheets facing upward, and opposite side edges of the sheets facing sideways.

8. The method of claim 7, wherein the pin is inserted through the top edges of the sheets.

9. The method of claim 6, wherein the pin is inserted proximate the centers of the sheets.

10. The method of claim 6, further comprising counting the sheets in the book.

11. The method of claim 10, further comprising verifying that the correct book is present in the machine based on the number of sheets counted.

12. The method of claim 6, wherein manipulating the book comprises bending the binding of the book thereby bending the entire book.

13. The method of claim 6, further comprising fixing the second book portion while the first book portion is moved away from the second book portion.

14. The method of claim 6, wherein the book is a passport and the desired page is on the front cover sheet, the back cover sheet, or a page on a sheet that is next to the front cover sheet or the back cover sheet.

15. A machine for automatically opening a closed, multiple sheet bound book that is inserted into the machine for subsequent processing on a desired page of the book, comprising:

an input through which a closed, multiple sheet bound book is introduced into the machine; and an opening station at which the book is opened, the opening station including:

i) a manipulating mechanism that manipulates the book in a manner to spread the sheets apart;

ii) a sensor positioned to sense the spread apart sheets of the book; and iii) an extensible and retractable pin positioned to be inserted between the sheet that contains the desired page and the sheet that contains the page that faces the desired page to define a first book portion and a second book portion.

16. The machine of claim 15, further comprising an actuation mechanism connected to the pin for actuating the pin in a manner to assist in moving the first book portion away from the second book portion and expose the desired page to be processed.

17. The machine of claim 16, further comprising a fixing mechanism that is configured to fix the second book portion as the first book portion is moved away therefrom.

18. The machine of claim 15, wherein the book is introduced into the machine in a vertical orientation with its binding facing downward, top edges of the sheets facing upward, and opposite side edges of the sheets facing sideways, and when the book is at the opening station, the sensor and the pin are positionable above the upwardly facing top edges of the sheets.

19. The machine of claim 15, wherein the book is a passport and the desired page is on a front cover sheet, a back cover sheet, or a page on a sheet that is next to the front cover sheet or the back cover sheet.

* * * * *